United States Patent
Wallrafen

(10) Patent No.: US 10,630,148 B2
(45) Date of Patent: Apr. 21, 2020

(54) ACTUATOR HAVING A POSITION SENSOR

(71) Applicant: Continental Automotive GmbH, Hannover (DE)

(72) Inventor: Werner Wallrafen, Hattersheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 16 days.

(21) Appl. No.: 15/115,960

(22) PCT Filed: Jul. 1, 2015

(86) PCT No.: PCT/EP2015/064956
§ 371 (c)(1),
(2) Date: Aug. 2, 2016

(87) PCT Pub. No.: WO2016/001289
PCT Pub. Date: Jan. 7, 2016

(65) Prior Publication Data
US 2017/0163128 A1    Jun. 8, 2017

(30) Foreign Application Priority Data
Jul. 2, 2014   (DE) .................. 10 2014 212 804

(51) Int. Cl.
*H02K 11/21* (2016.01)
*H02P 6/16* (2016.01)
(Continued)

(52) U.S. Cl.
CPC .............. *H02K 11/21* (2016.01); *H02P 6/14* (2013.01); *H02P 6/16* (2013.01); *H02P 7/18* (2013.01)

(58) Field of Classification Search
CPC .... H02K 11/21; H02K 11/042; H02K 11/044; H02K 11/046; H02K 11/048;
(Continued)

(56) References Cited

U.S. PATENT DOCUMENTS

| 5,389,864 A | 2/1995 | Tiyan et al. ................ 318/562 |
| 5,486,759 A | 1/1996 | Seiler et al. ............. 324/207.2 |

(Continued)

FOREIGN PATENT DOCUMENTS

| CN | 1704766 A | 12/2005 | ............ G01R 33/07 |
| CN | 201142660 Y | 10/2008 | ............ F04D 27/00 |

(Continued)

OTHER PUBLICATIONS

German Office Action, Application No. 102014212804.8, 5 pages, dated Mar. 20, 2015.

(Continued)

*Primary Examiner* — Alfonso Perez Borroto
*Assistant Examiner* — Alexander A Singh
(74) *Attorney, Agent, or Firm* — Slayden Grubert Beard PLLC

(57) ABSTRACT

The present disclosure relates to actuators in general. In some embodiments, an actuator system may include an electric motor having motor terminals and driving the actuator; a control unit operating the electric motor; and an active electronic position sensor for detecting a position of an actuator. Electrical energy for the operation of the position sensor is tapped from the control unit via the motor terminals. The terminals of the control voltage $U_{M1}$ and $U_{M2}$ for operation of the motor are switched such that at least one motor terminal, at periodic intervals, delivers a positive voltage and, during idling of the motor or during the braking of the motor, at least one of the two motor terminals of the control voltage $U_{M1}$, $U_{M2}$ carries a positive voltage $U_B$.

9 Claims, 2 Drawing Sheets

(51) Int. Cl.
*H02P 7/18* (2006.01)
*H02P 6/14* (2016.01)

(58) Field of Classification Search
CPC ...... H02K 11/049; H02K 11/05; H02K 11/20; H02K 11/215; H02K 11/225; H02K 11/30; H02K 11/33; H02P 6/14
USPC ................ 310/68 R, 68 B, 68 D, 207.2, 165, 310/207.25; 307/122; 318/466, 489; 324/207.2, 165, 207.25
See application file for complete search history.

(56) References Cited

U.S. PATENT DOCUMENTS

| | | | | | |
|---|---|---|---|---|---|
| 5,545,961 | A | * | 8/1996 | Peter | H02H 1/06 |
| | | | | | 318/146 |
| 5,646,466 | A | * | 7/1997 | Noji | H02K 3/47 |
| | | | | | 310/112 |
| 6,472,884 | B1 | | 10/2002 | Brockhaus | 324/539 |
| 6,545,441 | B1 | | 4/2003 | Grady | 318/666 |
| 2005/0046366 | A1 | * | 3/2005 | Wevers | B60N 2/0232 |
| | | | | | 318/280 |
| 2014/0002000 | A1 | * | 1/2014 | Lauwaert | H02P 8/34 |
| | | | | | 318/599 |
| 2015/0002135 | A1 | * | 1/2015 | Moyer | G01R 19/14 |
| | | | | | 324/119 |

FOREIGN PATENT DOCUMENTS

| | | | | |
|---|---|---|---|---|
| DE | 19947698 | A1 | 5/2001 | ............. G01D 21/00 |
| DE | 102008047494 | A1 | 4/2010 | ............... H02P 6/00 |
| EP | 0593925 | A1 | 4/1994 | ............. G01D 5/14 |
| EP | 0757426 | A3 | 5/1998 | ............. H02K 29/08 |
| EP | 2680431 | A2 | 1/2014 | ............... H02P 5/68 |
| WO | 00/62413 | A1 | 10/2000 | ............... H02P 6/16 |
| WO | 2016/001289 | A1 | 1/2016 | ............... G01D 5/14 |

OTHER PUBLICATIONS

International Search Report and Written Opinion, Application No. PCT/EP2015/064956, 11 pages, dated Sep. 30, 2015.
Chinese Office Action, Application No. 201580007204.0, 12 pages, dated Feb. 23, 2018.
CN Notice of Grant, Application No. 201580007204.0, 6 pages, dated Dec. 6, 2018.
European Office Action, Application No. 15733443.4, 5 pages, dated May 20, 2019.

* cited by examiner

ACTUATOR HAVING A POSITION SENSOR

CROSS-REFERENCE TO RELATED APPLICATIONS

This application is a U.S. National Stage Application of International Application No. PCT/EP2015/064956 filed Jul. 1, 2015, which designates the United States of America, and claims priority to DE Application No. 10 2014 212 804.8 filed Jul. 2, 2014, the contents of which are hereby incorporated by reference in their entirety.

TECHNICAL FIELD

The present disclosure relates to actuators in general. In some embodiments, the teachings may disclose an actuator having an electric motor controlled by a control unit and having an active electronic position sensor for detecting the actuator position.

BACKGROUND

Actuators are used for a wide variety of purposes, for example for the actuation of valves or dampers in motor vehicles. The actuators may have an electric motor controlled, for example, by an electronic motor control unit (ECU). The electric motor can drive, for example, an actuating element, the positional variation of which, via a gear train, is detected by a position sensor. A supply voltage is required for the operation of such a position sensor.

In typical examples from the prior art, active position sensors for the positional detection or positional control of actuators are supplied with electrical energy (generally a voltage) by means of separate feeders. Accordingly, there are various output signals for the transmission of the actuator position. The known analog interface is ratiometric to the supply voltage. Consequently, the supply voltage, which is generated as a reference value in the control unit, must also be directly linked to the position sensor. A different situation applies in the case of supply voltage-independent (non-ratiometric) output signals from position sensors. In this case, the supply voltage does not necessarily need to be routed from the control unit, if the sensor can be supplied with energy by another means. However, a problem remains, in that a supply voltage which is separate from the motor, for example 5V, needs to be routed to the position sensors via separate feeders. The same applies to the recently introduced digital functions for the transmission of position signals in which, for example, a digital serial SENT protocol is used for a point-to-point connection (with no bus).

It will be understood that the provision of separate feeders of this type is a complex arrangement.

An actuator system is described in U.S. Pat. No. 5,389,864. In this system, the electrical energy for the operation of the position sensor is tapped from the control unit via the motor terminals of the motor control line.

A further actuator system with similar characteristics is known from U.S. Pat. No. 6,545,441 B1.

A connection circuit for a measuring device is described in DE 19947698 A1, in which the adjustment of a voltage supply by means of a power converter is described.

SUMMARY

The present disclosure describes actuators characterized by an exceptionally simple design.

In some embodiments, an actuator having an electric motor controlled by a control unit and having an active electronic position sensor for detecting the actuator position, wherein electrical energy for the operation of the position sensor is tapped from the control unit via the motor terminals of the motor control line, may include terminals (5, 6) of the control voltage $U_{M1}$ and $U_{M2}$ for the operation of the motor (4) are switched such that at least one motor terminal (5, 6), at periodic intervals, delivers a positive voltage and that, during the idling of the motor and/or during the braking of the motor, at least one of the two motor terminals (5, 6) of the control voltage $U_{M1}$, $U_{M2}$ carries a positive voltage $U_B$.

In some embodiments, a common ground potential is available for the bridge circuit of the motor control system and the signal evaluation system.

In some embodiments, the output signals of the position sensor (9), within a specified range, remain independent of the supply voltage.

In some embodiments, down-circuit of the motor terminal (5, 6) tap-off on the control line of the control unit (1), a rectifier circuit with a storage capacitor (8) for the generation of a filtered DC voltage is arranged, which delivers a sufficient voltage to the electronic position sensor (9).

In some embodiments, a series resistor (7) is also provided.

In some embodiments, the rectifier circuit comprises a bridge circuit (13).

In some embodiments, a separate ground connection line (11) is routed to the position sensor (9), and in that the rectifier circuit is only provided with a half-bridge (12).

In some embodiments, the rectifier circuit is comprised of active transistors.

In some embodiments, it is provided with a brushless motor with two or more terminals.

BRIEF DESCRIPTION OF THE DRAWINGS

The teachings are described in greater detail hereinafter with reference to exemplary embodiments, in association with the drawings. Herein.

DETAILED DESCRIPTION

In embodiments of the present disclosure, separate feeders for the delivery of a separate supply voltage to the position sensor can be omitted. Instead, the control line or supply line of the motor of the control unit provided, which is present in any case, is also used to supply electrical energy to the position sensor. Any additional lines can therefore be omitted. At least one motor terminal, at periodic intervals, delivers a positive voltage. To this end, the terminals of the control voltages $U_{M1}$ and $U_{M2}$ for the operation of the motor are switched such that, during the idling of the motor (with terminals $U_{M1}$ and/or $U_{M2}$ connected in a high-resistance circuit via transistors) and/or during the braking of the motor (with $U_{M1}$ and $U_{M2}$ switched to the same potential→short-circuit between $U_{M1}$ and $U_{M2}$), at least one of the two motor terminals $U_{M1}$, $U_{M2}$ carries a positive voltage $U_B$.

Moreover, a common ground potential is available for a bridge circuit of the motor control system and the signal evaluation system. The output signals of the position sensor, within a specified range, remain independent of the supply voltage (non-ratiometric).

In some embodiments, down-circuit of the motor terminal tap-off on the control line of the control unit, a rectifier circuit with a storage capacitor for the generation of a filtered DC voltage is arranged, which delivers a sufficient voltage to the electronic position sensor. A series resistor may also be provided for this purpose.

The rectifier circuit may comprise a bridge circuit.

In some embodiments, a separate ground connection line is routed to the position sensor, wherein the rectifier circuit is only provided with a half-bridge.

The rectifier circuit can also be comprised of active transistors. This arrangement results in a smaller voltage drop.

Some embodiments include a brushless motor with two or more terminals.

Figure 1:
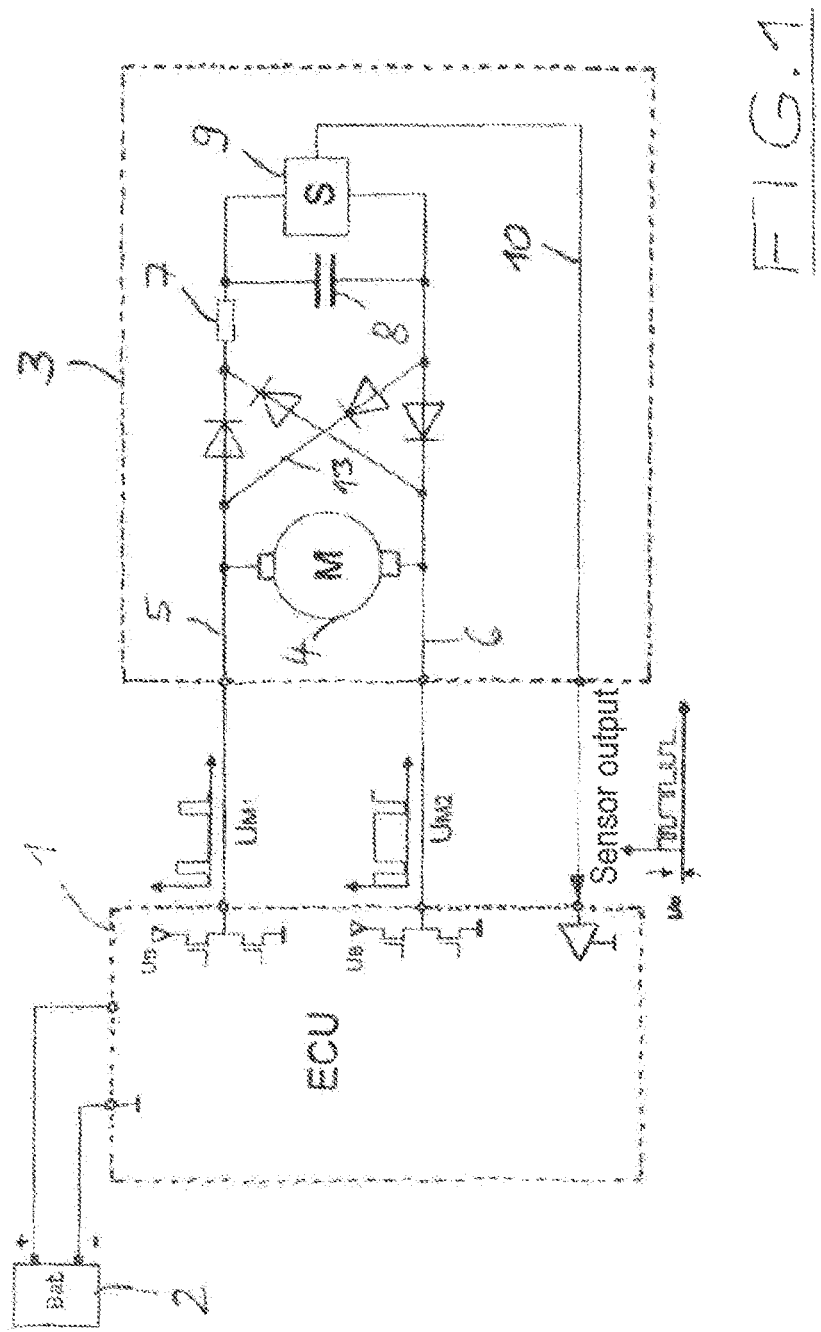
FIG. 1 shows a block circuit diagram of a first form of embodiment of an actuator with a control unit and a power supply.

FIG. 1 shows a block circuit diagram of an actuator 3, controlled by a control unit (ECU) 1, which is supplied with a voltage by a battery 2. The actuator 3 incorporates an electric motor 4 which actuates an actuating element, which is not represented here, the position or positional variation of which is detected by a position sensor 9. The corresponding position or positional variation is routed from the position sensor 9 in the form of electrical signals via a line 10 of the control unit 1.

The electric motor 4 is supplied with a pulsed voltage via the lines 5, 6 of the control unit 1. The power supply of the motor 4 is also employed for the supply of electrical energy (DC voltage) for the operation of the position sensor 9, such that separate feeders for the operation of the sensor 9 can be omitted. Specifically, down-circuit of the motor terminal tap-off, a rectifier circuit with a series resistor 7 and a storage capacitor 8 is provided for this purpose. By this arrangement, a filtered DC voltage is generated, which provides a sufficient voltage supply for the electronic position sensor 9.

In the embodiment represented in FIG. 1, the rectifier circuit is provided with a bridge circuit 13, which incorporates diodes. It is thus provided that at least one terminal, at periodic intervals, delivers a positive voltage, and a common ground potential is available for the bridge circuit and the signal evaluation system. The terminals of the control voltage $U_{M1}$ and $U_{M2}$ for the operation of the motor 4 are switched such that, during the idling of the motor and/or during the braking of the motor, at least one of the two motor terminals $U_{M1}$, $U_{M2}$ carries a positive voltage $U_B$.

Figure 2:
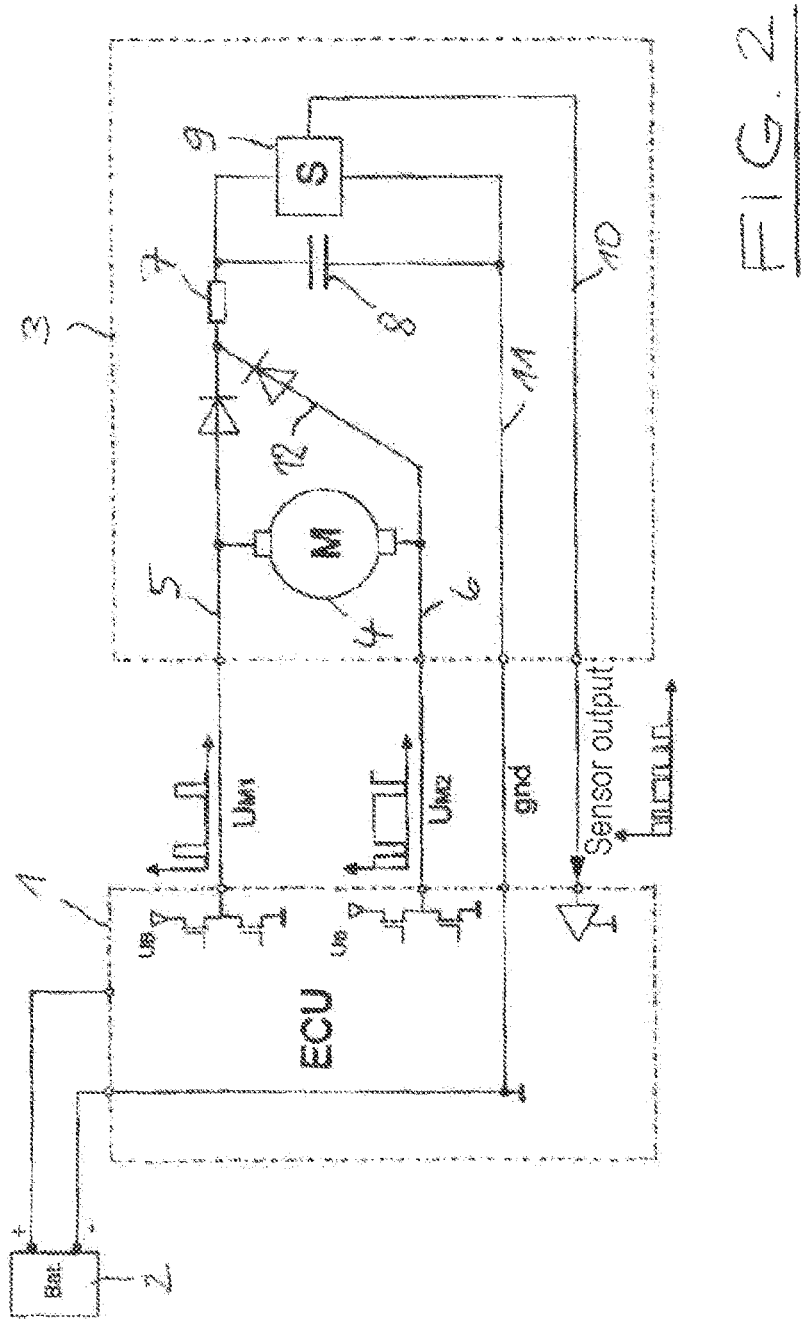
FIG. 2 shows a block circuit diagram of a second form of embodiment of an actuator with a control unit and a power supply.

Essentially, the embodiment represented in FIG. 2 differs from that represented in FIG. 1 in that a separate ground connection line 11 is routed from the control unit 1 to the position sensor 9. In this embodiment, the rectifier circuit incorporates only a half-bridge 12, with diodes.

The embodiment shown in FIG. 1 thus represents an actuator feedback system with no sensor power feeders, in the form of a three-wire arrangement, while the embodiment shown in FIG. 2 represents a system of this type in the form of a four-wire arrangement. In all cases, separate feeders for the delivery of the requisite supply voltage to the position sensor can be omitted.

What is claimed is:

1. An actuator system comprising:
   an electric motor having motor terminals and driving the actuator;
   a control unit connected to the electric motor via a first line and a second line and configured to supply first and second pulsed motor control voltage $U_{M1}$ and $U_{M2}$ on the first and second lines, respectively, to thereby operate the electric motor; and
   an active electronic position sensor for detecting a position of an actuator;
   wherein the active electronic position sensor is arranged in a parallel circuit to the motor terminals and fed electrical energy from the control unit;
   a rectifier circuit connected down-circuit of the electric motor with respect to the control unit, and between the electric motor and the active electronic position sensor, the rectifier circuit configured to convert the pulsed motor control voltage $U_{M1}$ and $U_{M2}$ applied to the electric motor to a filtered DC voltage applied to the active electronic position sensor;
   wherein the terminals of the control voltage $U_{M1}$ and $U_{M2}$ for operation of the motor are switched such that at least one motor terminal, at periodic intervals, carries a positive voltage and, throughout a respective duration of at least one of braking and idling of the motor, at least one of the two motor terminals of the control voltage $U_{M1}$, $U_{M2}$ carries a positive voltage $U_B$ to the active electronic position sensor.

2. The actuator system as claimed in claim 1, further comprising a common ground potential available for a bridge circuit of a motor control system and a signal evaluation system.

3. The actuator system as claimed in claim 1, wherein a magnitude of output signals of the active electronic position sensor corresponding to the position of the actuator do not depend on a magnitude of the voltage fed to the active electronic position sensor.

4. The actuator system as claimed in claim 1, wherein the rectifier circuit includes a storage capacitor for delivering a filtered DC voltage to the electronic position sensor.

5. The actuator system as claimed in claim 4, further comprising a series resistor.

6. The actuator system as claimed in claim 1, wherein the rectifier circuit comprises a bridge circuit.

7. The actuator system as claimed in claim 1, further comprising:
   a separate ground connection line routed to the position sensor, and
   a half-bridge provided to the rectifier circuit.

8. The actuator system as claimed in claim 1, wherein the rectifier circuit comprises only active transistors.

9. The actuator system as claimed in claim 1, further comprising a brushless motor with two or more terminals.

* * * * *